US011656995B2

(12) United States Patent
Bavishi et al.

(10) Patent No.: US 11,656,995 B2
(45) Date of Patent: May 23, 2023

(54) DYNAMIC ACCESS GRANULARITY IN A CACHE MEDIA

(71) Applicant: Micron Technology, Inc., Bosie, ID (US)

(72) Inventors: Dhawal Bavishi, San Jose, CA (US); Robert M. Walker, Raleigh, NC (US)

(73) Assignee: Micron Technology, Inc., Boise, ID (US)

( * ) Notice: Subject to any disclaimer, the term of this patent is extended or adjusted under 35 U.S.C. 154(b) by 82 days.

(21) Appl. No.: 16/695,878

(22) Filed: Nov. 26, 2019

(65) Prior Publication Data

US 2021/0157736 A1 May 27, 2021

(51) Int. Cl.
*G06F 12/0875* (2016.01)
(52) U.S. Cl.
CPC .................. *G06F 12/0875* (2013.01)
(58) Field of Classification Search
None
See application file for complete search history.

(56) References Cited

U.S. PATENT DOCUMENTS

| 6,467,031 B1* | 10/2002 | Fanning | G06F 12/0835 |
| | | | 711/119 |
| 2008/0270741 A1* | 10/2008 | Tremaine | G06F 13/28 |
| | | | 711/E12.001 |
| 2011/0138149 A1* | 6/2011 | Karlsson | G06F 12/1027 |
| | | | 711/E12.001 |
| 2011/0252200 A1* | 10/2011 | Hendry | G06F 12/0831 |
| | | | 711/121 |
| 2014/0156958 A1* | 6/2014 | Dow | G06F 9/00 |
| | | | 711/162 |
| 2015/0371689 A1* | 12/2015 | Li | G11C 11/4093 |
| | | | 711/105 |
| 2020/0250090 A1* | 8/2020 | Ware | G06F 12/0868 |
| 2021/0042226 A1* | 2/2021 | Ware | G06F 12/0871 |

FOREIGN PATENT DOCUMENTS

WO WO-2014070200 A1 * 5/2014 ............ G06F 11/073

* cited by examiner

*Primary Examiner* — Charles Rones
*Assistant Examiner* — Ryan Dare
(74) *Attorney, Agent, or Firm* — Lowenstein Sandler LLP (57) ABSTRACT

A method comprising receiving a memory access request comprising an address of data to be accessed and determining an access granularity of the data to be accessed based on the address of the data to be accessed. The method further includes, in response to determining that the data to be accessed has a first access granularity, generating first cache line metadata associated with the first access granularity and in response to determining that the data to be accessed has a second access granularity, generating second cache line metadata associated with the second access granularity. The method further includes storing the first cache line metadata and the second cache line metadata in a single cache memory component.

20 Claims, 8 Drawing Sheets

FIG. 7

DYNAMIC ACCESS GRANULARITY IN A CACHE MEDIA

TECHNICAL FIELD

Embodiments of the disclosure relate generally to memory sub-systems, and more specifically, relate to dynamic access granularity in a cache media.

BACKGROUND

A memory sub-system can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of various embodiments of the disclosure.

DETAILED DESCRIPTION

Aspects of the present disclosure are directed to dynamic data access granularities in a cache media of a memory sub-system. A memory sub-system can be a storage device, a memory module, or a hybrid of a storage device and memory module. Examples of storage devices and memory modules are described below in conjunction with FIG. 1. In general, a host system can utilize a memory sub-system that includes one or more memory devices that store data. The host system can provide data to be stored at the memory sub-system and can request data to be retrieved from the memory sub-system.

A memory module can be accessed by multiple processing components of a host system. In some instances, the processing components (e.g., a central processing unit (CPU), or a graphical processing unit (GPU)), can have different optimal or preferred data access granularities. For example, a CPU can optimally retrieve data from memory in segments that are 64 bytes in size while a GPU can optimally retrieve data from memory in segments that are 32 bytes in size. Conflicts in access granularity management can arise in circumstances in which two processing components with different access granularities are accessing data from the same memory module. Conventional memory modules do not directly provide multiple access granularities to the host system. In conventional memory modules, if two processing components use different access granularities, the memory module provides the data in segments of a single size to the host system. Components of the host system must then identify the different access granularities and format the segments of data according to the correct access granularity of each processing component. Therefore, conventional memory modules do not support multiple access granularities unless the host system includes additional components and/or logic. The additional components and/or logic can increase access latency, increase cost, and reduce available space within the host system, such as on a processor.

Aspects of the present disclosure address the above and other deficiencies by providing dynamic access granularity in a cache media of a memory sub-system. A cache memory component can support cache lines with different access granularities by adjusting status bits of cache line metadata according to the access granularity of each corresponding cache line. Depending on the access granularity of a particular cache line, a cache controller can manage certain status bits of the cache line metadata to identify the status of sectors within the cache line. For example, the cache line metadata can include a mode bit which can indicate the access granularity of the cache line. According to the mode bit, and thus the access granularity, the cache controller can use particular status bits of the cache line metadata to manage the cache line. Each cache line can include the same number of status bits and the cache controller can use the mode bit, or granularity, to determine which status bits to use to manage the cache line. For example, if the access granularity is a smaller size, then the cache controller can manage each status bit of the cache line metadata. If the access granularity is a larger size then the cache controller can manage just half of the status bits, for example. Alternatively, if no mode bit is used, the cache controller can set each bit of the cache line metadata despite the access granularity. Since there are fewer sectors in the larger access granularity cache lines and the number of available status bits is constant, the cache controller can set more status bits for each sector. For example, 2 status bits can be used for a 32 byte sector while 4 status bits can be used for a 64 byte sector. In another example, the cache memory component can be divided into physically separate partitions that each store cache lines with a single access granularity.

Therefore, the ability to provide dynamic access granularity within a memory sub-system could reduce data access latency for host systems that include devices using different granularities of data. In addition, dynamic access granularity in the memory sub-system could reduce the overhead required to provide multiple access granularity and could provide compatibility across many different host devices using either single access granularity or multiple access granularities.

Figure 1:
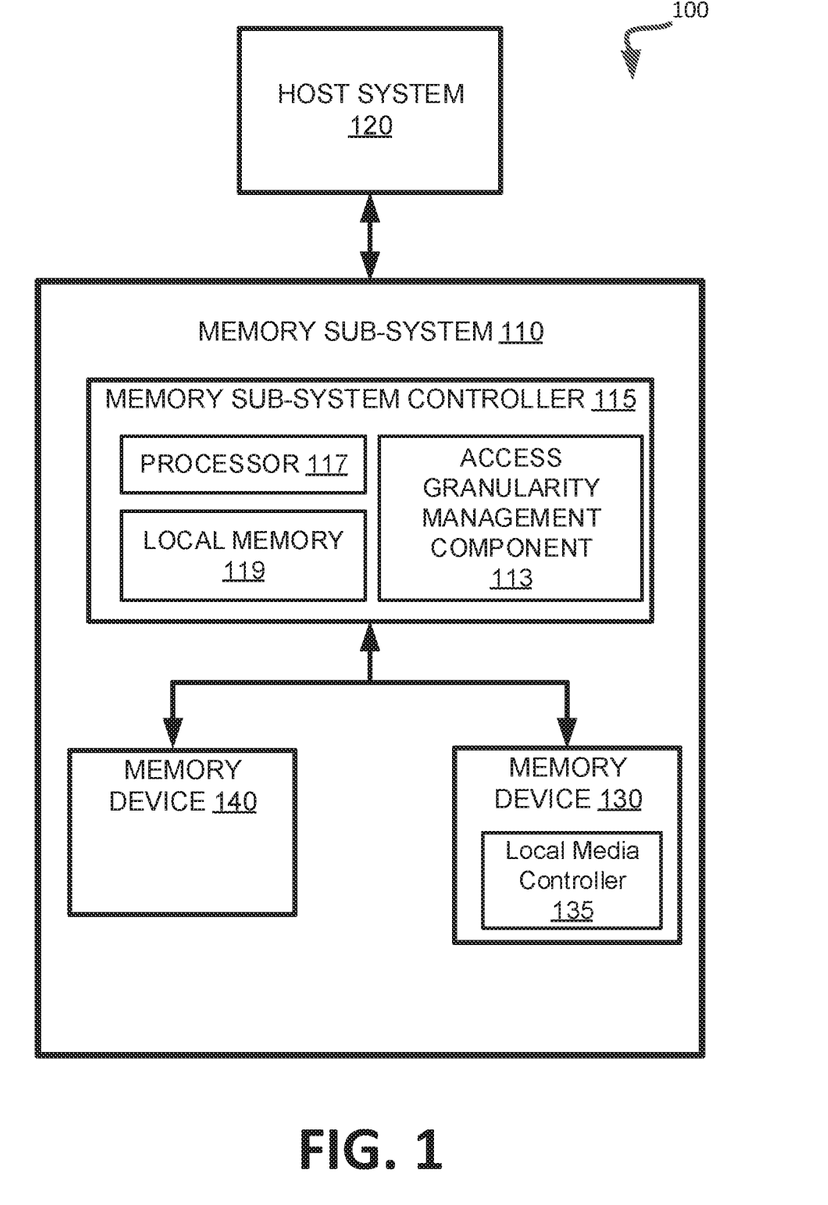
FIG. 1 illustrates an example computing environment that includes a memory sub-system, in accordance with some embodiments of the present disclosure.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access the memory components (e.g., memory devices 130) when the memory sub-system 110 is coupled with the host system 120 by the PCIe interface. The physical host interface can provide an interface for passing control, address, data, and other signals between the memory sub-system 110 and the host system 120.

The memory devices can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased.

Although non-volatile memory components such as 3D cross-point type and NAND type flash memory are described, the memory device 130 can be based on any other type of non-volatile memory, such as read-only memory (ROM), phase change memory (PCM), self-selecting memory, other chalcogenide based memories, ferroelectric random access memory (FeRAM), magneto random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased.

One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 may not include a memory sub-system controller 115, and may instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 includes an access granularity management component 113 that can be used to provide dynamic access granularity in a cache media. In some embodiments, the memory sub-system controller 115 includes at least a portion of the access granularity management component 113. For example, the memory sub-system controller 115 can include a processor 117 (processing device) configured to execute instructions stored in local memory 119 for performing the operations described herein. In some embodiments, the access granularity management component 113 is part of the host system 110, an application, or an operating system.

The access granularity management component 113 can generate cache line metadata including status bits associated with sectors of a cache line in a cache memory component. The access granularity management component 113 can manage the status bits of the sectors of a cache line according to the access granularity of the associated cache line. The access granularity management component 113 can additionally access and read the status bits of the cache line metadata to determine a status of a sector of a cache line. Further details with regards to the operations of access granularity management component 113 are described below.

Figure 2:
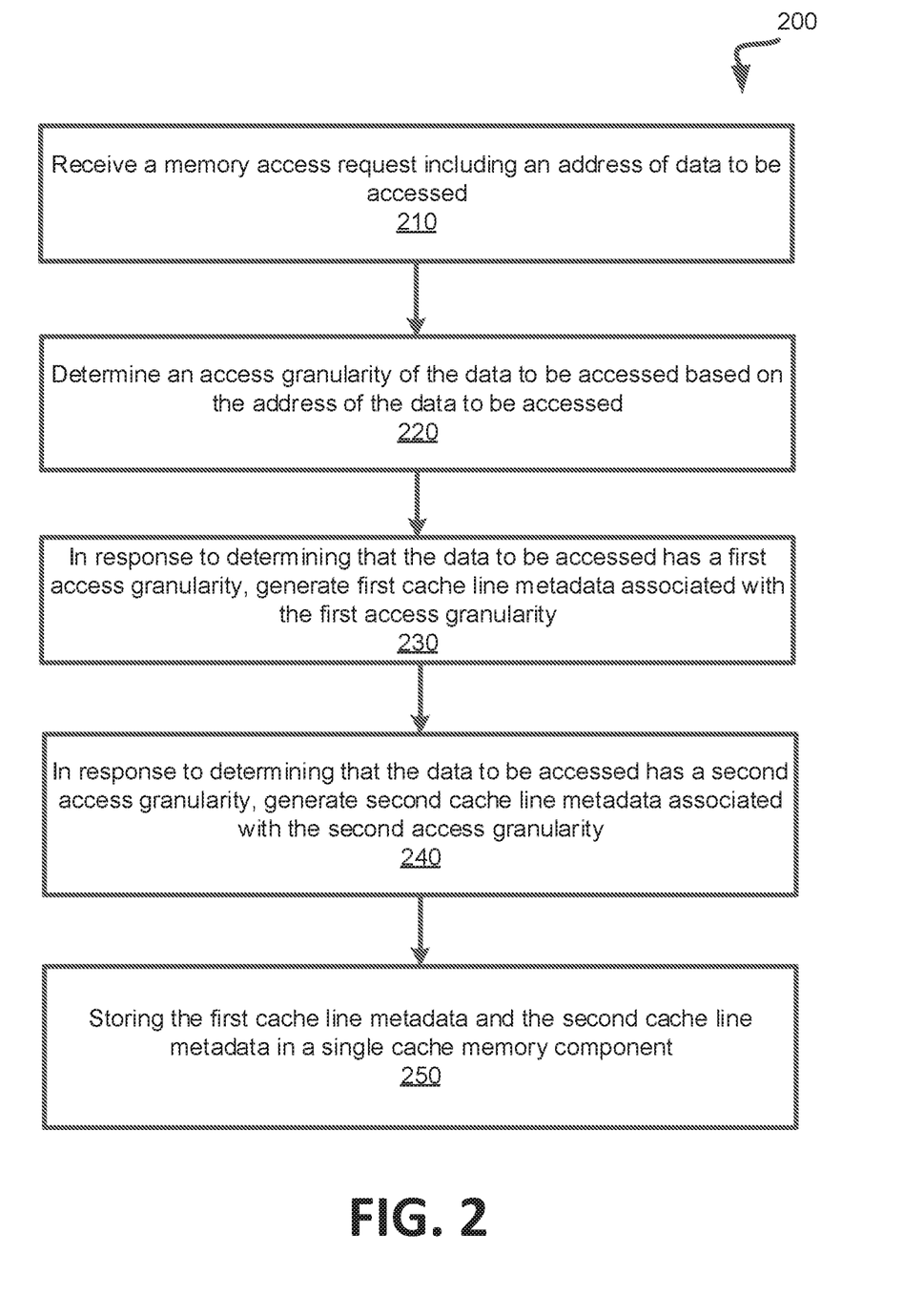
FIG. 2 is a flow diagram of an example method to dynamically generate cache line metadata for multiple access granularities, in accordance with some embodiments of the present disclosure.

FIG. 2 is a flow diagram of an example method 200 to generate cache line metadata for multiple access granularities, in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the access granularity management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 210, processing logic of a memory sub-system receives a memory access request including an address of data to be accessed. The address can identify a location in a backend memory such as 3DXP, flash memory, DRAM or any other memory or storage media. The memory access request can be a read operation or a write operation or any other data operation. In addition, the data to be accessed can be stored in the backend memory as well as a separate cache memory component with a lower access latency than the backend memory.

At operation 220, the processing logic of a memory sub-system determines an access granularity of the data to be accessed based on the address of the data to be accessed. The processing logic can compare the address of the data to be accessed with address ranges, or regions of memory, identifying different access granularities. For example, the processing logic can query a lookup table, an address map, a set of registers, or the like, to determine which region of memory the address falls within. One region of memory can be associated with one access granularity (e.g., for a CPU) and another region of memory can be associated with another access granularity (e.g., for a GPU).

At operation 230, the processing logic generates, in response to determining that the data to be accessed has a first access granularity, first cache line metadata associated with the first access granularity. The first cache line metadata can include one or more bits indicating whether a cache line of the data to be accessed is dirty and/or valid. If the data to be accessed has a first access granularity then the processing logic can manage a defined number of status bits in the cache line metadata to indicate valid and dirty statuses. For example, the first access granularity can be 32 bytes and for each 32 byte sector in a cache memory component, one status bit of the cache line metadata can indicate dirty and one status bit of the cache line metadata can indicate valid. Thus, when accessing data from the cache memory component that is of the first granularity, the processing logic can use the one dirty bit and the one valid bit to determine the status of the cache line At operation 240, the processing logic generates, in response to determining that the data to be accessed has a second access granularity, second cache line metadata associated with the second access granularity. The second cache line metadata can include the same number of status bits as the first cache line metadata, but the processing logic can set and interpret the bits of the second cache line metadata differently according to the second access granularity. For example, the second access granularity can be 64 bytes (i.e., two contiguous 32 byte sections) and the processing logic can set the status bits of the second cache line metadata accordingly.

In one example, the processing logic can identify a mode bit of the cache line metadata. The mode bit can indicate the access granularity of the cache line and which status bits of the cache line metadata to use for the access granularity of the cache line. For example, a mode bit set to 1 can indicate a first access granularity and the mode bit set to 0 can indicate a second access granularity.

In another example, before any access of data, the processing logic can determine the access granularity of the cache line of the data to access using an address map or lookup table. Then the processing logic can manage the status bits of the cache line metadata according to the identified access granularity. For example, for a 32 byte access granularity the processing logic can use a set of bits for each 32 byte sector of data. For a 64 byte access granularity the processing logic can use two pairs of status bits for a 64 byte sector of data, where the two pairs of status bits are set the same (i.e., each 32 byte portion of the 64 byte sector can be set the same).

In yet another example, the cache memory component can be partitioned into physically separate caches with different access granularities. Each partition can additionally include its own corresponding cache line metadata. Thus, the processing logic can switch between access granularities without additional status bits.

At operation 250, the processing logic stores the first cache line metadata and the second cache line metadata in a single cache memory component. Although the first cache line metadata and the second cache line metadata are associated with different access granularities of cached data, since the processing logic identifies the access granularities and determines the status of the cache line based on the access granularity, the processing logic can store and access the associated data from the same cache memory component.

Figure 3:
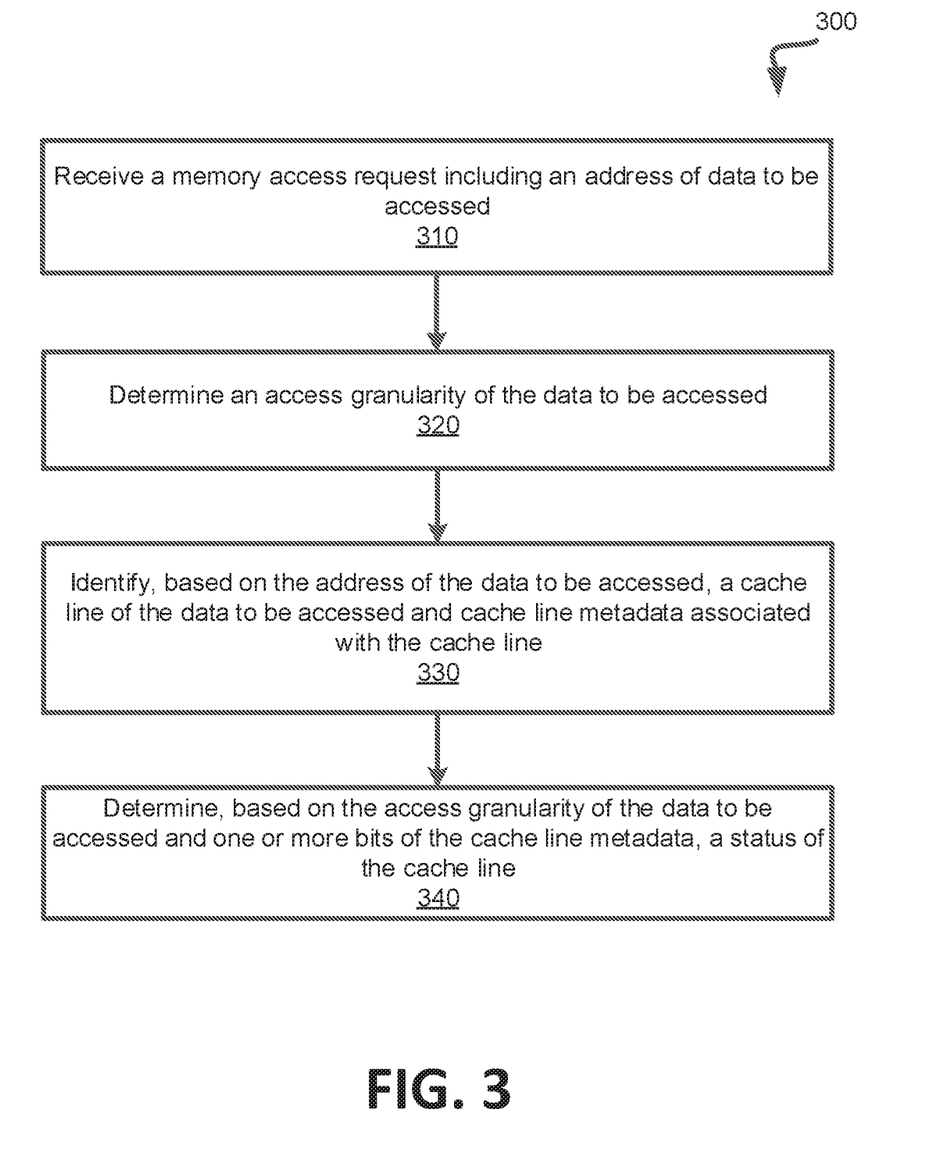
FIG. 3 is a flow diagram of an example method to access cache lines with different access granularities, in accordance with some embodiments of the present disclosure.

FIG. 3 is a flow diagram of an example method 300 to access cache lines with different access granularities, in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the access granularity management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments.

Thus, not all processes are required in every embodiment. Other process flows are possible.

At operation 310, processing logic of a memory subsystem receives a memory access request including an address of data to be accessed. The address can identify a location in a backend memory such as 3DXP, flash memory, DRAM or any other memory or storage media. The memory access request can be a read operation or a write operation or any other data operation. In addition, the data to be accessed can be stored in the backend memory as well as a separate cache memory component with a lower access latency than the backend memory.

At operation 320, the processing logic determines an access granularity of the data to be accessed. To determine the access granularity of the data to be accessed, the processing logic can compare the address of the data with two or more distinct ranges of memory addresses. Each range of memory addresses can store data with a particular access granularity. For example, a first range of memory addresses can be associated with data accessible by a CPU while a second range of memory addressed can be associated with data accessible by a GPU. The data accessible by the CPU can have one accesses granularity (e.g., 64 bytes) while the data accessible by the GPU can have a different access granularity (e.g., 32 bytes). The association between memory ranges and access granularity can be stored in a data structure such as a lookup table or an address mapping table.

At operation 330, the processing logic identifies, based on the address of the data to be accessed, a cache line of the data to be accessed and cache line metadata associated with the cache line. The cache line of the data to be accessed can include the data from the address of the backend media which is temporarily stored at the cache memory component. The cache line in the cache memory component can be modified by write operations received from the host system and can be forwarded to the host system in response to a read operation. To identify the cache line and cache line metadata, the processing logic can match the address of the data to be accessed that was received from the memory access request of the host system to a metadata tag included in the cache line metadata. In one example, the processing logic can use just a portion of the address to identify the cache line metadata and the corresponding cache line.

The cache line metadata associated with the cache line can include metadata indicating the status of the cache line, access information about the cache line, and any other data relevant to the cache line. The status metadata of the cache line can include at least a dirty bit and a valid bit. The dirty bit can indicate that the cache line has been modified and thus contains data that is inconsistent with the data in the backend media. When the cache line is indicated as dirty, the cache line can be written back to the backend media prior to removing the cache line from the cache memory component to ensure that the modifications persist in the stored data. The valid bit can indicate that the cache line contains valid data and can be used in a data access operation.

At operation 340, the processing logic determines, based on the access granularity of the data to be accessed and one or more bits of the cache line metadata, a status of the cache line. The processing logic can identify which bits of the cache line metadata to use to determine the status of the cache line based on the access granularity of the data. The access granularity can indicate which bits, and how many bits, of the cache line metadata indicate the status of the cache line.

In one example, the processing logic can identify a mode bit of the cache line metadata. The mode bit can indicate the access granularity of the cache line and which status bits of the cache line metadata to use for the access granularity of the cache line. For example, a mode bit set to 1 can indicate a first access granularity and the mode bit set to 0 can indicate a second access granularity.

In another example, before any access of data, the processing logic can determine the access granularity of the cache line of the data to access using an address map or lookup table. The processing logic can then manage the status bits of the cache line metadata according to the identified access granularity. For example, for a 32 byte access granularity the processing logic can use a set of bits for each 32 byte sector of data. For a 64 byte access granularity the processing logic can use two pairs of status bits for a 64 byte sector of data, where the two pairs of status bits are set the same (i.e., each 32 byte portion of the 64 byte sector can be set the same).

In yet another example, the cache memory component can be partitioned into physically separate caches with different access granularities. Each partition can additionally include its own corresponding cache line metadata. Thus, the processing logic can switch between access granularities without additional status bits.

Figure 4:
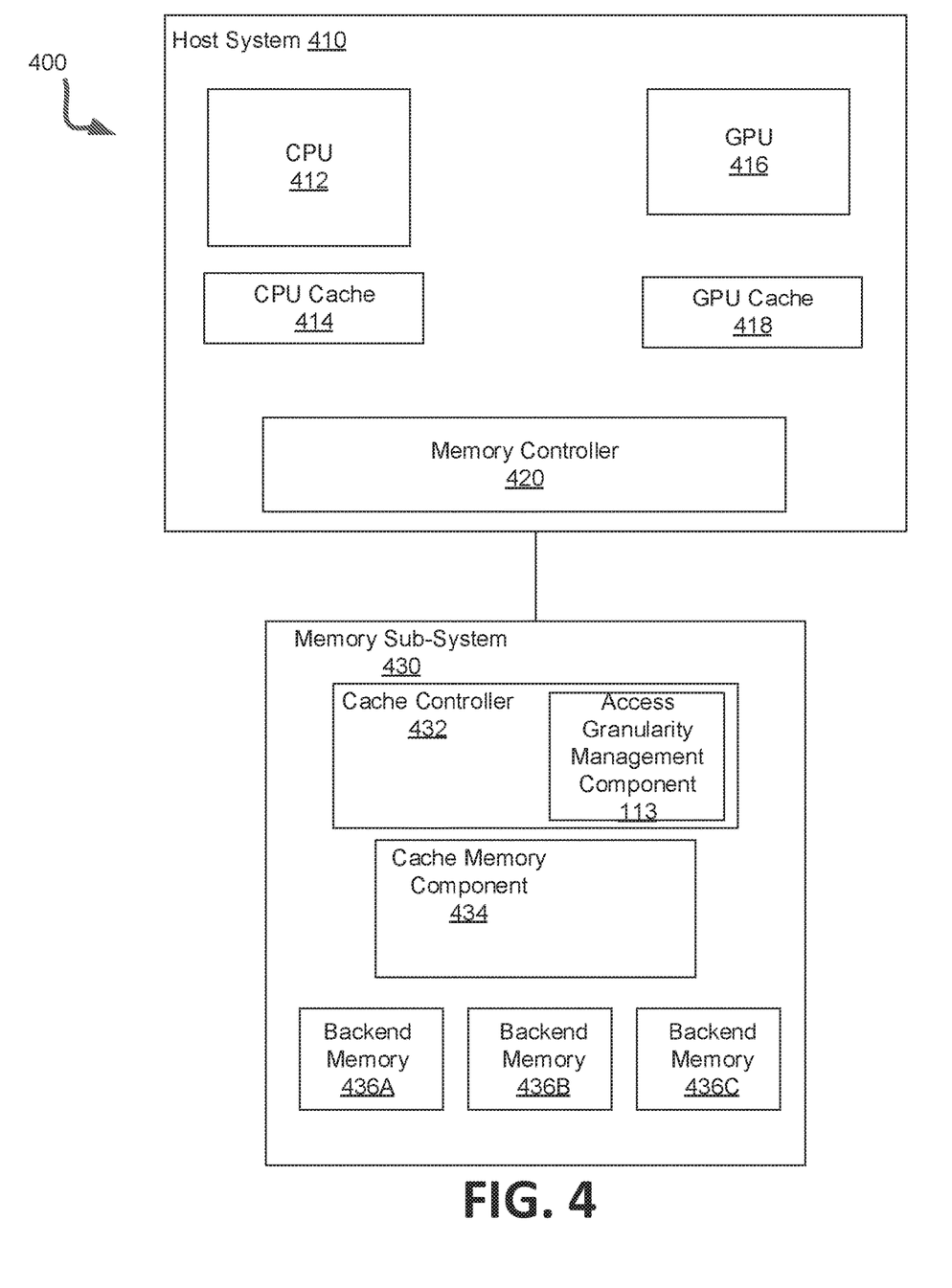
FIG. 4 illustrates a system using two different data access granularities in accordance with some embodiments of the present disclosure.

FIG. 4 depicts an example computing environment including a host system 410 and a memory sub-system 430. The host system includes both a CPU 412 and a GPU 416 each with an associated cache, CPU cache 414 and GPU cache 418. The CPU cache 414 and GPU cache 418 can each include a distinct cache hierarchy and different data access granularities. The memory controller 420 of the host system 410 can send memory access requests, including reads and writes, to the memory sub-system 430. The memory access requests can include access requests for the CPU 412 or the GPU 416. In one example, a memory access request from the CPU 412 can request data of one size while the GPU 416 requests data of another size (e.g., 64 bytes and 32 bytes respectively).

The memory sub-system 430 includes a cache controller 432, a cache memory component 434, and backend memory 436A-C. The cache controller 432 can include cache policies to determine data from the backend memory 436A-C to be cached at the cache memory component 434 for quick access of the data by the host system 410. Additionally, the cache controller 432 can identify data in the cache memory component 434 that is dirty and that should be evicted from the cache memory component 434. The cache controller 432 can write dirty cache lines of the cache memory component 434 back to the backend memory 436A-C to ensure the data is maintained correctly and remains consistent. The cache memory component 434 can include both cache lines of data and cache line metadata. Alternatively, the cache line metadata can be included in a separate cache metadata component, such as in SRAM or a CAM, for fast access of the metadata. The metadata can include tags to identify the cache line and status bits to indicate whether each accessible portion of the cache line contains valid data and whether the cache line is dirty (i.e., inconsistent with the backend memory 436A-C). The backend memory 436A-C can be a type of memory with a larger capacity and higher access latency than the cache memory component. 434. The backend memory 436A-C can be a form of persistent memory, such as 3DXP, flash or NAND memory, or any other form of persistent memory. The cache controller can include an access granularity management component 113 to manage the metadata of cache lines according to access granularity.

In one example, the access granularity management component 113 can identify a mode bit of the cache line metadata. The mode bit can indicate the access granularity of the cache line and which status bits of the cache line metadata to use for the access granularity of the cache line. For example, a mode bit set to 1 can indicate a first access granularity and the mode bit set to 0 can indicate a second access granularity.

In another example, before any access of data, the access granularity management component 113 can determine the access granularity of the cache line of the data to access using an address map or lookup table. The access granularity management component 113 can manage the status bits of the cache line metadata according to the identified access granularity. For example, for a 32 byte access granularity the access granularity management component 113 can use a set of bits for each 32 byte sector of data. For a 64 byte access granularity the access granularity management component 113 can use two pairs of status bits for a 64 byte sector of data, where the two pairs of status bits are set the same (i.e., each 32 byte portion of the 64 byte sector can be set the same).

In yet another example, the cache memory component can be partitioned into physically separate caches with different access granularities. Each partition can additionally include its own corresponding cache line metadata. Thus, the access granularity management component 113 can switch between access granularities without additional status bits.

Figure 5A:
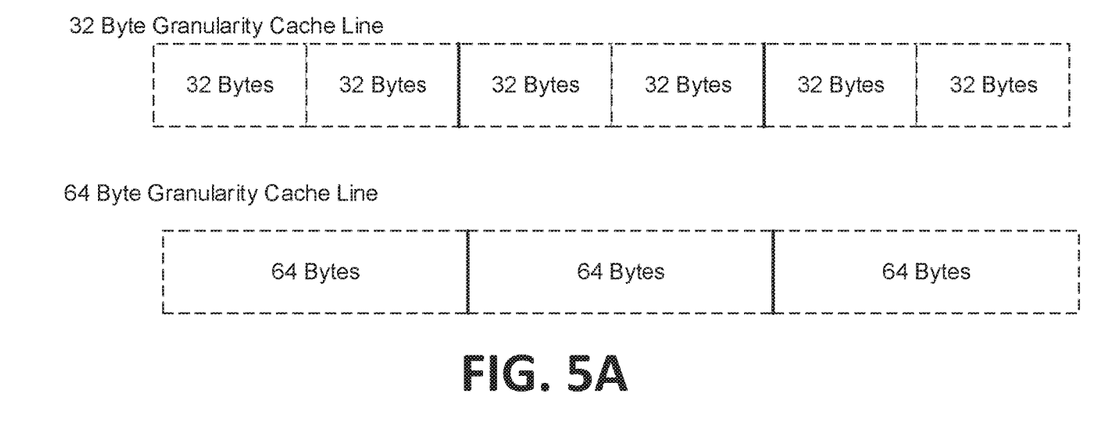
FIG. 5A illustrates example data access granularities of a cache media in accordance with some embodiments of the present disclosure.

FIG. 5A illustrates two example cache lines with two different access granularities. Although the depicted 32 byte granularity cache line has 6 different 32 byte sectors of data, the 32 byte granularity cache line can include any number of sectors of data (e.g., 8 sectors, 16 sectors, etc.). Similarly, although the depicted 64 byte granularity cache line has 3 different 64 byte sectors of data, the 64 byte granularity cache line can include any number of sectors of data (e.g., 4 sectors, 8 sectors, 16 sectors, etc.). As described below with respect to FIGS. 5B-D, a cache line can have associated cache line metadata used, for example by the access granularity management component, to indicate a status of each sector of data in a cache line and can include other metadata about the cache line (e.g., access data used for the caching scheme).

Figure 5B:
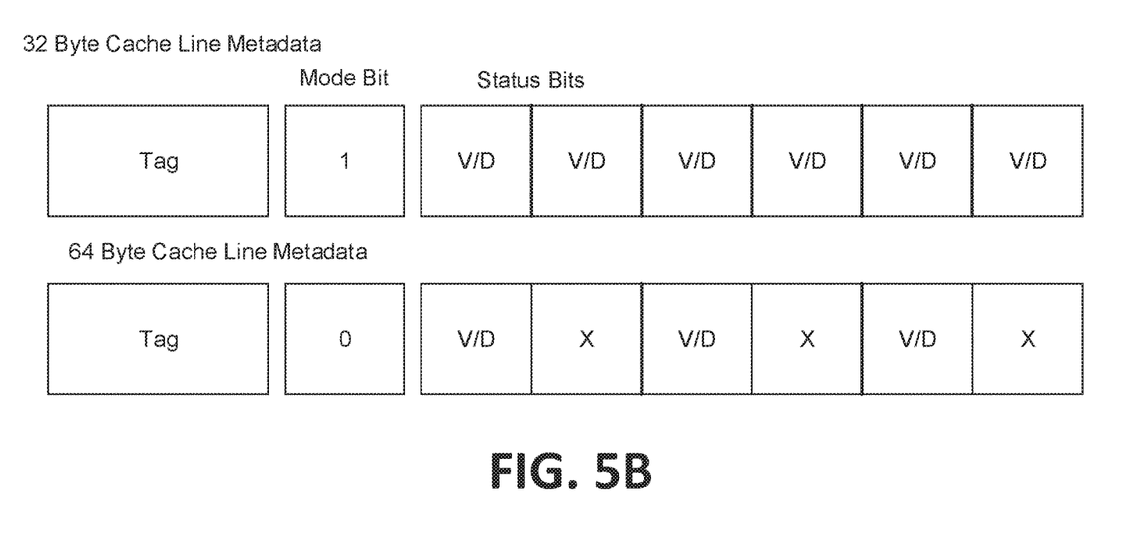
FIG. 5B illustrates example cache line metadata for different access granularities in accordance with some embodiments of the present disclosure.

FIG. 5B illustrates one example of cache line metadata for a 32 byte access granularity cache line and a 64 byte granularity cache line. Because the cache lines with different access granularities are included in the same cache memory component, the access granularity management component can first determine what access granularity the cache line includes. Once the access granularity management component determines the access granularity it can determine which bits of the cache line metadata to use to determine the status, among other information, of the sectors of the cache line.

For example, FIG. 5B depicts a 32 byte cache line metadata which includes a tag used to identify the metadata and the associated cache line, a mode bit, and 6 sets of status bits (one set for each 32 byte sector of FIG. 5A). The access granularity management component can identify the cache line metadata by matching an address of a data access request (or a portion of the address) to the tag of the cache line metadata. Once the cache line metadata is identified, the cache controller can determine what the access granularity of the cache line according to the mode bit. In one example, the mode bit set to 1 indicates a 32 byte cache granularity, while the mode bit set to 0 indicates a 64 byte cache granularity. It should be noted that any other granularity can be used (e.g., 8 byte and 16 bytes) and additional mode bits can be included to provide support for additional access granularities.

In another example, the access granularity management component can generate the cache line metadata according to the access granularity of the data of the cache line. The cache controller can determine the access granularity of the data based on the address of the data and set the mode bit of the cache line metadata according to the access granularity. Additionally, the access granularity management component can set the status bits for the sectors of the cache line according to the access granularity. For example, as depicted, each status bit in the cache line metadata can be set for the 32 byte cache lines, each set of status bits corresponding to a 32 byte sector of the cache line. For the 64 byte access granularity cache line metadata, every second set of status bits can be set (and later read) by the access granularity management component. Therefore, only half of the status bits of the 64 byte cache line metadata are set. In one example, the cache controller only sets the first set of every two sets of status bits. When accessing the cache line metadata, the access granularity management component can use the first set of every two sets of status bits to determine the status of a 64 byte sector.

Figure 5C:
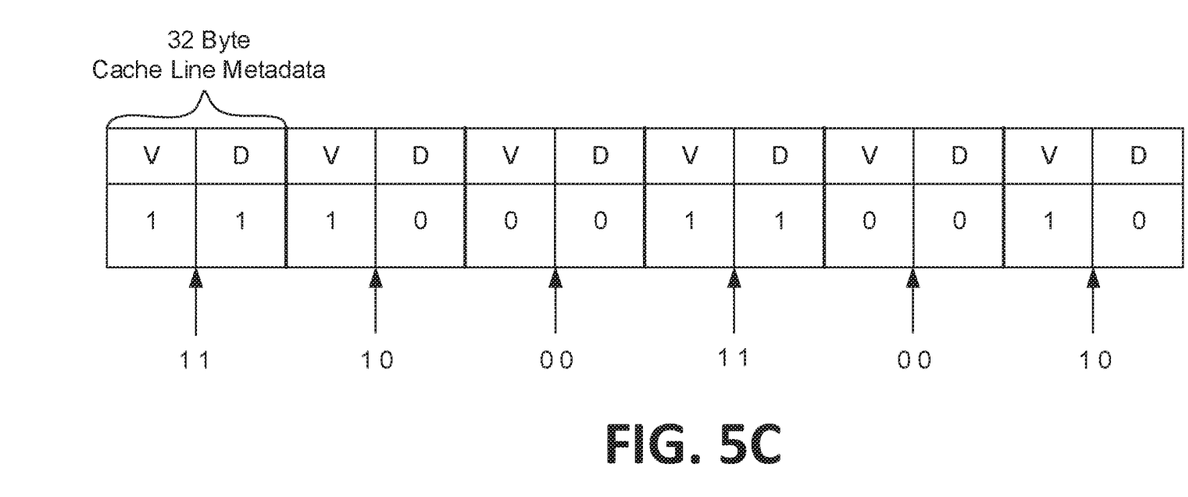
FIG. 5C illustrates example cache line metadata in accordance with some embodiments of the present disclosure.

FIG. 5C illustrates an example 32 byte access granularity cache line metadata including six sets of status bits. Each set of status bits can correspond to one of the 32 byte sectors of the 32 byte access granularity cache line depicted in FIG. 5A. In one example, the status bits of FIG. 5C are set and managed by a cache controller. Rather than setting a mode bit and checking the mode bit when accessing the data, the access granularity management component can determine the access granularity at the time of access using the address of the data to be accessed.

Figure 5D:
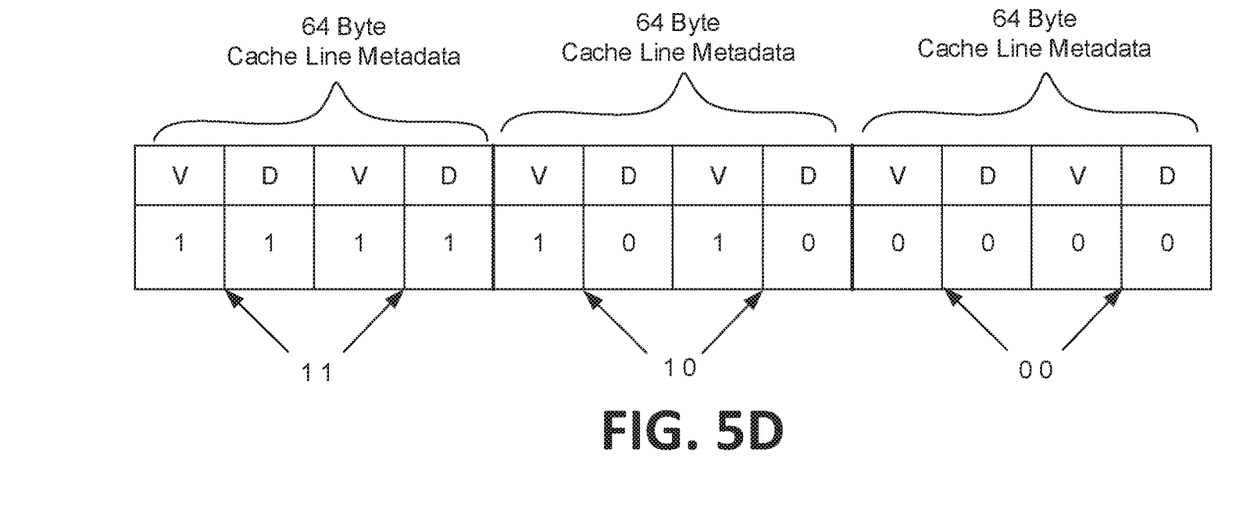
FIG. 5D illustrates example cache line metadata in accordance with some embodiments of the present disclosure.

FIG. 5D illustrates an example 64 byte access granularity cache line metadata including six sets of status bits. Each set of status bits can correspond to one of the 64 byte sectors of the 64 byte access granularity cache line depicted in FIG. 5A. In one example, the status bits of FIG. 5D are set and managed by a cache controller. Rather than setting a mode bit and checking the mode bit when accessing the data, the access granularity management component can determine the access granularity at the time of access using the address of the data to be accessed. Therefore, each status bit of the cache line metadata for the 64 byte access granularity cache line metadata is used by the cache controller. For example, as depicted in FIG. 5D, if the status of a 64 byte sector is valid and dirty, then four bit can be set to indicate that the 64 bytes are valid and dirty. The first two status bits can be set valid and dirty and the second two status bits can be set in the same way as the first two status bits when the cache line metadata is for data with 64 byte access granularity. In the same or different example, a second 64 byte sector can be valid and not dirty (1-0) and so both the first two status bits and the second two status bits can be set as valid and not dirty (1-0).

Figure 6:
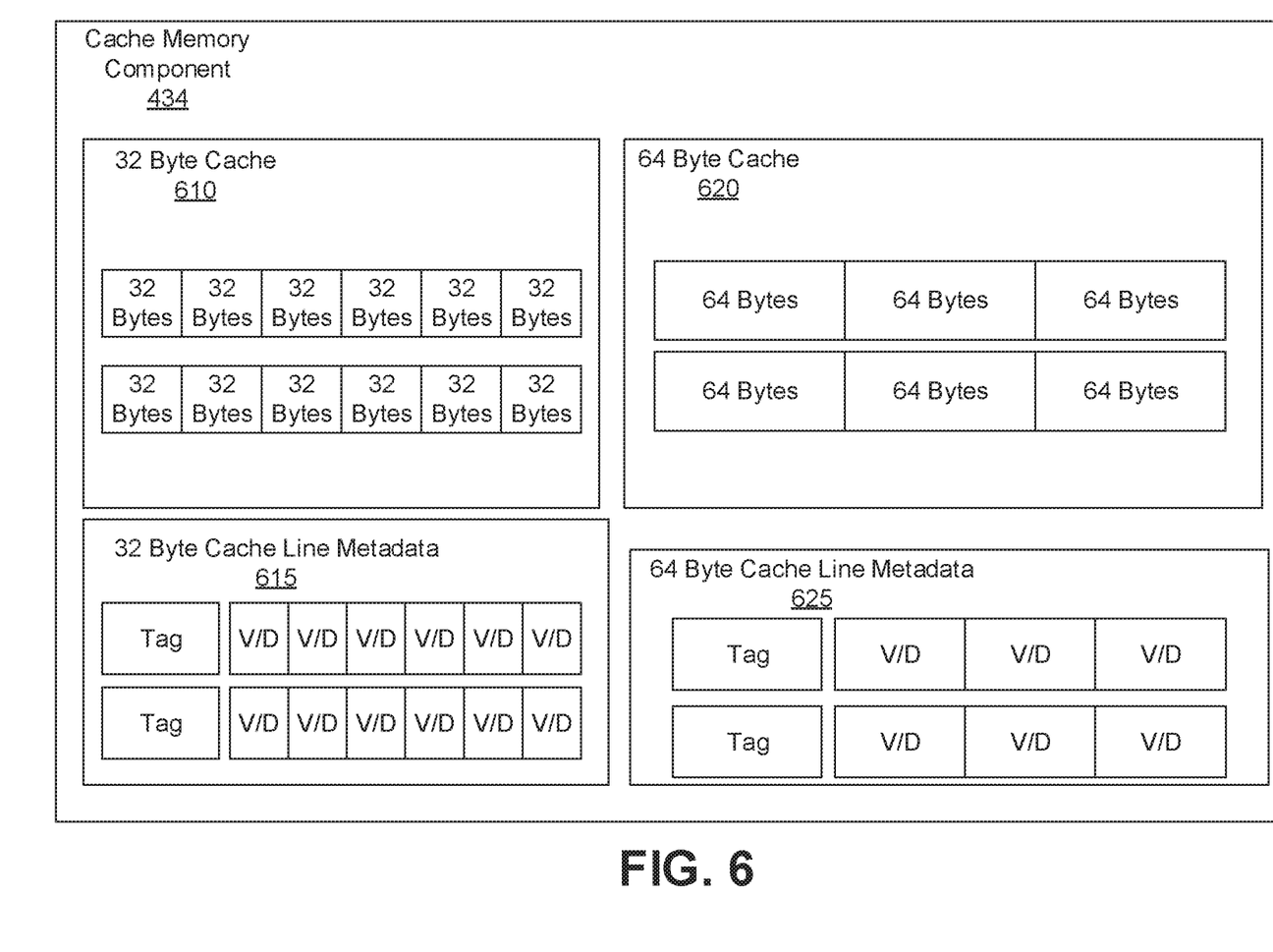
FIG. 6 illustrates a cache media with partitions for different data access granularities in accordance with some embodiments of the present disclosure.

FIG. 6 is a diagram illustrating a cache memory component 434 partitioned into different access granularities. The cache memory component 434 can be partitioned into a 64 byte cache granularity partition 620 and a 32 byte cache granularity partition 610. Alternatively, the cache component 434 can be partitioned into any number of different partitions and can include cache granularities different than 32 bytes and 64 bytes. In the 32 byte cache granularity partition 610, the data can be accessed from a cache line in 32 byte portions while the data in the 64 bytes cache granularity partition 620 can be accessed from a cache line in 64 byte portions. The 32 byte cache granularity partition 610 can therefore have distinct cache line metadata 615 associated with each of the cache lines stored in the 32 byte cache granularity partition 610. Similarly, the 64 byte cache granularity partition 620 can therefore have distinct cache line metadata 625 associated with each of the cache lines stored in the 64 byte cache granularity partition 620. Each cache line metadata for a cache line can include a tag to identify the cache line. The metadata for each cache line of the 32 byte cache metadata 615 can include status bits such as valid and dirty bits for each individual 32 byte portion of the 32 byte partition (i.e., as shown in FIG. 6, there can be 6 sets of status bits for each of the 6-32 byte portions of a cache line). The metadata for each cache line of the 64 byte cache metadata 625 can include status bits such as valid and dirty bits for each individual 64 byte portion of the 64 byte partition (i.e., as shown in FIG. 6, there can be 3 sets of status bits for each of the 3-64 byte portions of a cache line). It should be noted that a cache line and the number of bits for each cache line is not limited to the number depicted in FIG. 6.

Figure 7:
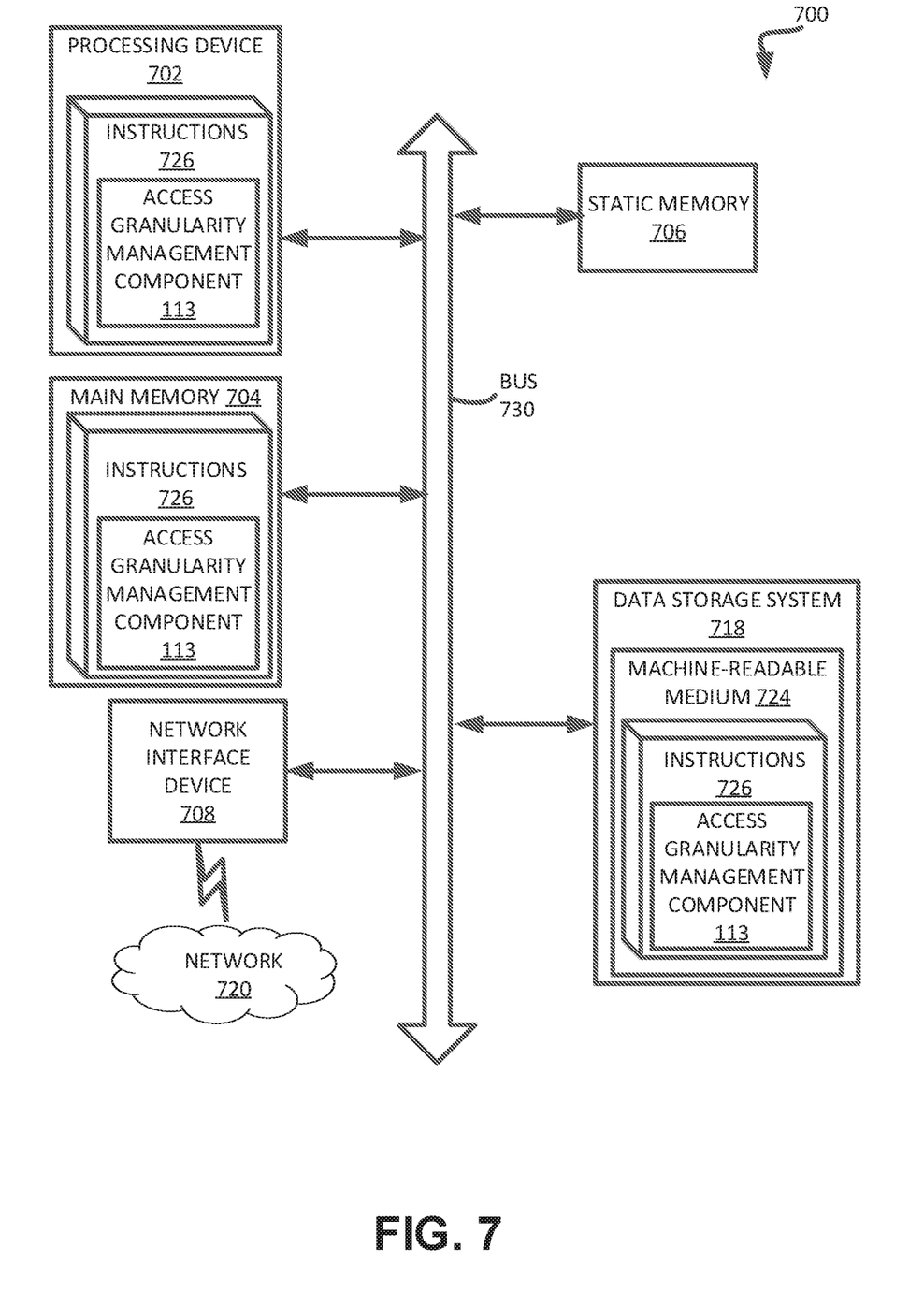
FIG. 7 is a block diagram of an example computer system in which embodiments of the present disclosure may operate.

FIG. 7 illustrates an example machine of a computer system 700 within which a set of instructions, for causing the machine to perform any one or more of the methodologies discussed herein, can be executed. In some embodiments, the computer system 700 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the access granularity management component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage system 718, which communicate with each other via a bus 730.

Processing device 702 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein. The computer system 700 can further include a network interface device 708 to communicate over the network 720.

The data storage system 718 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage system 718, and/or main memory 704 can correspond to the memory sub-system 110 of FIG. 1.

In one embodiment, the instructions 726 include instructions to implement functionality corresponding to a program pulse control component (e.g., the access granularity management component 113 of FIG. 1). While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
receiving a memory access request comprising an address of data to be accessed;
determining a first access granularity or a second access granularity of the data to be accessed based on comparing the address of the data to be accessed with two or more ranges of memory addresses;
in response to determining that the data to be accessed has the first access granularity associated with a first processing component accessing a single cache memory component, generating first cache line metadata associated with the first access granularity and set each status bit of the first cache line metadata associated with the address to indicate a valid status and a dirty status of a first cache line;
in response to determining that the data to be accessed has the second access granularity associated with a second processing component accessing the single cache memory component, generating second cache line metadata associated with the second access granularity and set a subset of status bits of the second cache line metadata associated with the address to indicate a valid status and a dirty status of a second cache line; and storing the first cache line metadata and the second cache line metadata in the single cache memory component.

2. The method of claim 1, wherein generating the cache line metadata associated with the first access granularity comprises:

setting a mode bit of the first cache line metadata identifying the first access granularity.

3. The method of claim 1, wherein generating the cache line metadata associated with the second access granularity comprises:

setting a mode bit of the second cache line metadata identifying the second access granularity.

4. The method of claim 1, wherein generating the first cache line metadata associated with the first access granularity comprises setting one or more bits of the first cache line metadata, wherein the one or more bits comprises at least one of a first dirty bit or a first valid bit.

5. The method of claim 4, wherein generating the second cache line metadata associated with the second access granularity comprises setting one or more bits of the second cache line metadata associated with the address, wherein the one or more bits comprises at least one of the first dirty bit, the first valid bit, a second dirty bit, or a second valid bit.

6. The method of claim 1, wherein the first access granularity is smaller than the second access granularity.

7. The method of claim 1, wherein cache data corresponding to the first cache line metadata associated with the first access granularity is stored at a first partition of the cache memory component and cache data corresponding to the second cache line metadata associated with the second access granularity is stored at a second partition of the cache memory component.

8. A system comprising:

a memory component;

a processing device, operatively coupled to the memory component, to:

receive a memory access request comprising an address of data to be accessed;

determine an access granularity of the data to be accessed based on comparing the address with two or more ranges of memory addresses;

identify, based on the address, a cache line comprising the data to be accessed and cache line metadata associated with the cache line; and determine, based on the access granularity of the data to be accessed, which status bits of the cache line metadata indicate a status of the cache line; and determine, based on the status bits of the cache line, the status of the cache line, the status bits corresponding to one or more sectors of the cache line based on the access granularity of the data to be accessed.

9. The system of claim 8, wherein to determine the access granularity of the data to be accessed, the processing device is to:

identify one or more mode bits of the cache line metadata; and determine the access granularity of the data to be accessed based on the one or more mode bits.

10. The system of claim 9, wherein to determine the status of the cache line, the processing device is to:

select, based on the one or more mode bits, one or more bits of the cache line metadata; and determine, based on the one or more bits of the cache line metadata, a valid status of the cache line and a dirty status of the cache line.

11. The system of claim 8, wherein the access granularity of the data to be accessed is determined based on the address of the data to be accessed.

12. The system of claim 11, wherein to determine, based on the access granularity of the data to be accessed, the status of the cache line, the processing device is further to:

select, based on the access granularity of the data to be accessed, one or more bits of the cache line metadata, wherein the one or more bits comprise at least one of a first dirty bit, a first valid bit, a second dirty bit, or a second valid bit; and determine, based on the one or more bits of the cache line metadata, a valid status of the cache line and a dirty status of the cache line.

13. The system of claim 8, wherein to determine the access granularity of the data to be accessed, the processing device is to:

identify a partition of a plurality of partitions of a cache memory component in which the cache line is located; and determine the access granularity based on a predetermined access granularity of the partition in which the cache line is located.

14. The system of claim 8, wherein the processing device is further to:

identify, based on the access granularity of the data to be accessed, one or more bits of the cache line metadata, wherein the one or more bits indicate the status of the cache line.

15. A non-transitory computer-readable storage medium comprising instructions that, when executed by a processing device, cause the processing device to perform operations comprising:

receiving a memory access request comprising an address of data to be accessed;

determining an access granularity of the data to be accessed based on comparing the address of the data to be accessed with two or more ranges of memory addresses;

in response to determining that the data to be accessed has a first access granularity associated with a first processing component accessing a single cache memory component, generating first cache line metadata associated with the first access granularity and set each status bit of the first cache line metadata associated with the address to indicate a valid status and a dirty status of a first cache line;

in response to determining that the data to be accessed has a second access granularity associated with a second processing component accessing the single cache memory component, generating second cache line metadata associated with the second access granularity and set a subset of status bits of the second cache line metadata associated with the address to indicate a valid status and a dirty status of a second cache line; and storing the first cache line metadata and the second cache line metadata in the single cache memory component.

16. The non-transitory computer-readable storage medium of claim 15, wherein generating the cache line metadata associated with the first access granularity comprises:

setting a mode bit of the first cache line metadata identifying the first access granularity.

17. The non-transitory computer-readable storage medium of claim 15, wherein generating the cache line metadata associated with the second access granularity comprises:

setting a mode bit of the second cache line metadata identifying the second access granularity.

18. The non-transitory computer-readable storage medium of claim 15, wherein generating the first cache line metadata associated with the first access granularity comprises setting one or more bits of the first cache line metadata, wherein the one or more bits comprises at least one of a first dirty bit or a first valid bit.

19. The non-transitory computer-readable storage medium of claim 18, wherein generating the second cache line metadata associated with the second access granularity comprises setting one or more bits of the second cache line metadata associated with the address, wherein the one or more bits comprises at least one of the first dirty bit, the first valid bit, a second dirty bit, or a second valid bit.

20. The non-transitory computer-readable storage medium of claim 15, wherein cache data corresponding to the first cache line metadata associated with the first access granularity is stored at a first partition of the cache memory component and cache data corresponding to the second cache line metadata associated with the second access granularity is stored at a second partition of the cache memory component.

* * * * *